United States Patent
Yu et al.

(10) Patent No.: US 9,780,653 B2
(45) Date of Patent: Oct. 3, 2017

(54) DC-DC CONVERTER

(71) Applicant: MagnaChip Semiconductor, Ltd., Cheongju-si (KR)

(72) Inventors: Tim Yu, Cheongju-si (KR); Greg Wardle, Cheongju-si (KR)

(73) Assignee: Magnachip Semiconductor, Ltd., Cheongju-si (KR)

( * ) Notice: Subject to any disclaimer, the term of this patent is extended or adjusted under 35 U.S.C. 154(b) by 355 days.

(21) Appl. No.: 14/259,777

(22) Filed: Apr. 23, 2014

(65) Prior Publication Data
US 2015/0108954 A1 Apr. 23, 2015

(30) Foreign Application Priority Data
Oct. 18, 2013 (KR) .................. 10-2013-0124893

(51) Int. Cl.
G05F 1/00 (2006.01)
H02M 3/158 (2006.01)
H02M 3/156 (2006.01)
H02M 1/00 (2006.01)

(52) U.S. Cl.
CPC ........... H02M 3/158 (2013.01); H02M 3/156 (2013.01); *H02M 2001/0025* (2013.01)

(58) Field of Classification Search
CPC ......... H02M 3/158; H02M 2001/0025; H02M 3/156

USPC .......................................................... 323/271
See application file for complete search history.

(56) References Cited

U.S. PATENT DOCUMENTS

| | | | | |
|---|---|---|---|---|
| 7,482,793 B2* | 1/2009 | Stoichita | ............. | H02M 3/1563 323/271 |
| 2011/0267018 A1* | 11/2011 | Tao | ...................... | H02M 3/1563 323/282 |
| 2013/0002223 A1* | 1/2013 | Xi | .......................... | H02M 3/158 323/284 |
| 2014/0253082 A1* | 9/2014 | Swanson | ............... | H02M 3/156 323/284 |

\* cited by examiner

*Primary Examiner* — Adolf Berhane
*Assistant Examiner* — Afework Demisse
(74) *Attorney, Agent, or Firm* — NSIP Law

(57) ABSTRACT

A DC-DC converter having a coupling network is provided, in which the coupling network is so configured as to forcibly add a noise source to a feedback output voltage of the DC-DC converter. The coupling network includes one coupling resistor and two coupling capacitors to include the switching voltage of a power switch and inductor output voltage into the output voltage, and transmit the result together with the feedback output voltage to the comparator. Accordingly, it is easier to compare the reference voltage and the feedback voltage, and stably maintain the output voltage of the DC-DC converter operating in constant on-time (COT).

21 Claims, 3 Drawing Sheets

DC-DC CONVERTER

CROSS-REFERENCE TO RELATED APPLICATIONS

This application claims the benefit under 35 U.S.C. §119 (a) of Korean Patent Application No. 10-2013-0124893 filed on Oct. 18, 2013, in the Korean Intellectual Property Office, the entire disclosure of which is incorporated herein by reference for all purposes.

BACKGROUND

1. Field

The following description relates to a DC-DC converter. The following description also relates to a DC-DC converter provided with a coupling network to dynamically manage load transient phenomena by facilitating detection of ripple information of the output voltage.

2. Description of Related Art

Many electronic devices use switching converters to generate voltages adjusted for use by differing components of the devices. A DC-DC converter is one type of such switching converters. For example, a DC-DC converter is widely used in various fields as a device to receive DC voltage, convert the received DC voltage into DC voltage at different level, and output that DC voltage at the different level.

A DC-DC converter may be controlled by using constant on-time (COT) technology. According to COT technology, one or more switches to generate output voltages (VOUT) turn on for a predetermined time interval during each switching cycle. Using COT technology can provide features such as relatively fast response time and simple circuit design.

Generally, a DC-DC converter has some loss resulting from resistance of the inductor, occurring when the DC-DC converter has a heavy load current. However, such loss usually does not greatly influence the operation of the DC-DC converter. For example, a greater proportion of loss is generated may be due to components outside the DC-DC converter chip such as a power switch, for example P-type metal-oxide-semiconductor (PMOS) or N-type metal-oxide-semiconductor (NMOS) or the inductor itself. In this situation, the loss generated due to currents consumed inside the chip of the DC-DC converter, that is, the proportion of the current inside the chip, is relatively low. Therefore, the DC-DC converter operates without difficulty, such as efficiency deterioration, at every frequency.

By contrast, a DC-DC converter that has a relatively lighter load current may have efficiency deterioration. When the load current is small, larger currents are consumed by the chip itself, compared to the load currents themselves. Accordingly, increasing currents inside the chip may cause deteriorated conversion efficiency of the DC-DC converter, because the currents inside the chip become more significant to overall conversion efficiency.

Hence, reducing the currents inside the chip may prevent the deteriorations in efficiency.

One way to reduce chip current consumption is to reduce the frequency of switching driving involved in chip driving. This approach is relevant because it is the driver related with switching driving that has the greatest influence on current use during chip driving. For example, when an arbitrary threshold value 5 mA is forcibly supplied while it is 1 mA at the output, the frequency of switching may be reduced by ⅕.

Another way to reduce chip current consumption is to apply a COT mode. According to this approach, the COT generator maintains constant on time during power switching driving. By using the COT technology, a comparator compares the feedback voltage with a reference voltage, and switches on the power switch for a predetermined time when the feedback voltage is lower than the reference voltage. Accordingly, the COT mode offers features not offered by an alternative control mode such as pulse-width modulation (PWM) mode when it comes to managing a load transient phenomenon that occurs when the load abruptly changes.

However, the COT mode has an aspect that it presents a greater ripple phenomenon than the PWM mode.

Because of the issues related to the greater ripple phenomenon, to the chip may rapidly detect the feedback output voltage in the COT mode. Without such a rapid determination, the chip is not able to adequately maintain the output voltage based on turn-on timing of the power switch. For example, the output voltage might otherwise be lower than the zero point defined by the reference voltage, which in turn causes the entire efficiency of the DC-DC converter to deteriorate.

A comparator may be provided, which may provide a high speed detection operation. However, it is difficult to produce high-speed design in consideration of appropriate gains for the comparator. Further, when a high-speed comparator is employed, the entire chip size increases, which also causes an additional issue related to increased current consumption.

Accordingly, yet another approach is to adjust the capacitance of the output capacitor which is connected to the output load. By using a capacitor with a larger equivalent series resistance (ESR), the feedback voltage as recognized at the comparator increases. It is thus easier to detect the feedback voltage.

However, depending on the situation, a capacitor with a relatively lower ESR is sometime used. When such a capacitor with a relatively lower ESR is used, it becomes relatively more difficult to detect the feedback voltage at the comparator provided in the DC-DC converter. In other words, it becomes more difficult to detect the ripple values of the output voltage.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

As discussed, it is difficult to compare the reference voltage and the feedback voltage and maintain a stable output voltage, in situations where it is not possible to use a high-speed operating comparator at a DC-DC converter that uses a capacitor with a smaller ESR.

Accordingly, the present application presents ways to address the issues mentioned above. It is an object of the present example to provide a DC-DC converter operating in COT mode, which maintains output voltage stably, because a comparator in examples is able to detect ripple values of the output voltage more efficiently whenever current flows in an inductor.

Another feature of the present examples is that they provide a DC-DC converter that detects feedback output voltage easily, even when an output capacitor provided at an output of the DC-DC converter has a relatively small equivalent series resistance (ESR) value.

In one general aspect, a DC-DC converter includes a comparator configured to compare a reference voltage to a feedback voltage, a constant on-time (COT) generator configured to output an on-time signal of a power switch, in response to a result of the comparison at the comparator, a first switch and a second switch each configured to turn on for a predetermined time interval, according to the on-time signal, an inductor connected in series to a common terminal of the first and second switches, a first feedback resistor and a second feedback resistor connected between the inductor and a load resistor, and a coupling network configured to receive switching voltages of the first switch and the second switch and a feedback output voltage of the inductor, sum the received voltages, and output the result of summing as a first feedback voltage, wherein the first feedback voltage and a second feedback voltage outputted via the first feedback resistor and the second feedback resistor are provided as the feedback voltage of the comparator.

The coupling network may include a coupling resistor connected to the common terminal, a first coupling capacitor connected to an output end of the inductor, and a second coupling capacitor that is connected in parallel to the coupling resistor and the first coupling capacitor and that is configured to output the first feedback voltage.

The first feedback voltage may include an AC voltage of the output voltage of the switching voltages and the inductor.

The second feedback voltage may include a DC voltage of an output voltage of an output end of the converter.

The first and second switches may be complementary MOS transistors.

In response to the first switch being PMOS, the second switch may be NMOS, or in response to the first switch being NMOS, the second switch may be PMOS.

The first feedback voltage and the second feedback voltage may be supplied to the comparator, in response to electric current flowing through the inductor.

In another general aspect, a DC-DC converter includes a comparator configured to compare a reference voltage to a feedback voltage, a constant on-time (COT) generator configured to output an on-time signal of a power switch, in response to a result of the comparison at the comparator, a first switch and a second switch each configured to turn on for a predetermined time interval, according to the on-time signal, an inductor connected in series to a common terminal of the first and second switches, a first feedback resistor and a second feedback resistor connected between the inductor and a load resistor, and a coupling resistor connected to an output pin of the COT generator, a first coupling capacitor connected to an output end of the inductor, and a coupling network connected in parallel to the coupling resistor and the first coupling capacitor to output the first feedback voltage, wherein the first feedback voltage and a second feedback voltage outputted via the first feedback resistor and the second feedback resistor are provided as the feedback voltage of the comparator.

The DC-DC converter may further include a third switch between an output pin of the COT generator and the coupling resistor to select between a continuous current mode (CCM) and a discontinuous current mode (DCM) according to an electric current flowing through the inductor.

The first feedback voltage may include a DC voltage of the output voltage, and the second feedback voltage may include an AC voltage of the output voltage.

The first and second switches may be complementary MOS transistors, and in response to the first switch being PMOS, the second switch may be NMOS, or in response to the first switch being NMOS, the second switch may be PMOS.

The converter may be configured to operate in CCM until a current slope of the inductor becomes zero.

The converter may be configured to operate in DCM when current slope of the inductor has a negative value.

The second switch may be turned off and the first switch may be turned on at a time point when the current slope of the inductor becomes a negative value.

The second switch may be NMOS and the first switch may be PMOS.

In another general aspect, a coupling network configured to receive switching voltages of a first switch and a second switch and a feedback output voltage of an inductor, sum the received voltages, and output the result of summing as a first feedback voltage includes a coupling resistor connected to a common terminal of the first and second switches, wherein the inductor is connected in series to the common terminal, a first coupling capacitor connected to an output end of the inductor, and a second coupling capacitor that is connected in parallel to the coupling resistor and the first coupling capacitor and that is configured to output the first feedback voltage.

The first feedback voltage may include an AC voltage of the output voltage of the switching voltages and the inductor.

The first switch and the second switch may be configured to turn on for a predetermined time interval, according to an on-time signal of a power switch generated by a constant on-time (COT) generator.

The COT generator may generate the on-time signal of the power switch in response to a result of a comparison at a comparator that is configured to compare a reference voltage to a feedback voltage.

The first feedback voltage and a second feedback voltage outputted via the feedback resistor may be provided as the feedback voltage of the comparator.

According to a DC-DC converter configured according to various examples, the converter provides a coupling network is provided to specifically add a noise component to a feedback voltage whenever electric current flows in the inductor. Accordingly, the comparator for comparing the reference voltage with the feedback voltage is more easily able to detect ripple information, and the DC-DC converter operating in COT mode is able to stably maintain output voltage and provide subsequently increased overall efficiency.

Furthermore, in constructing such a coupling network, it is possible to design a DC-DC converter without having to consider electrostatic discharge (ESD) or electric overstress (EOS). Thus, such a DC-DC converter avoids an issue that is present in alternative approaches.

Other features and aspects will be apparent from the following detailed description, the drawings, and the claims.

Figure 1:
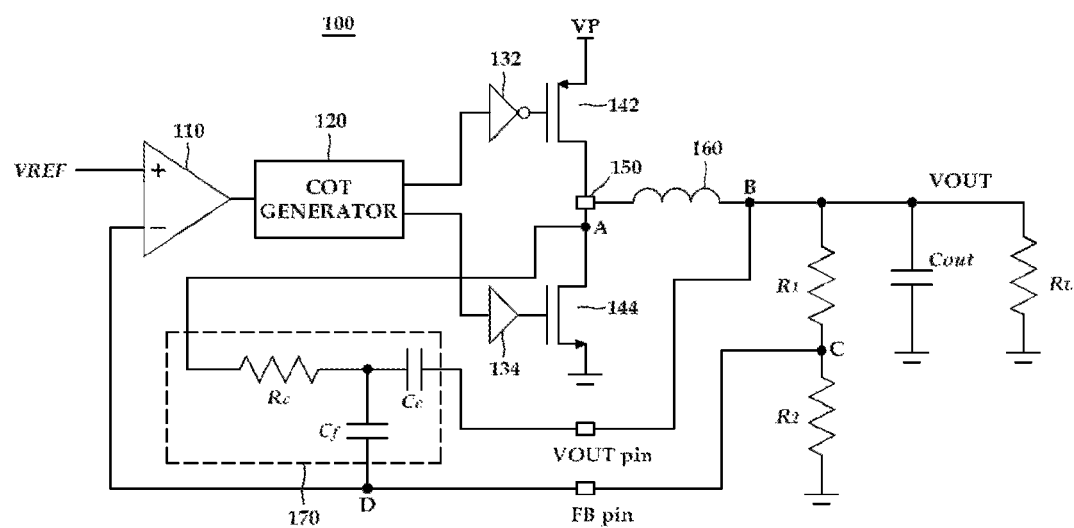
FIG. 1 is a circuit diagram of a DC-DC converter having a coupling network according to a first example.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

In one simple example, the DC-DC converter has increased efficiency, since a chip, such as a comparator, can detect ripple values of an output voltage easily. For example, the chip can detect ripple values of the output voltage without changing the ripple values of the feedback output voltage of the DC-DC converter. To this purpose, a coupling network is provided in the DC-DC converter, which is configured to add noise to the feedback voltage.

Features and aspects of DC-DC converters according to examples are explained further with reference to the accompanying drawings.

FIG. 1 is a circuit diagram of a DC-DC converter having a coupling network according to a first example.

Referring to FIG. 1, the DC-DC converter 100 includes a comparator 110 that receives a reference voltage (VREF) via a non-inverting terminal (+) and receives feedback voltage via an inverting terminal (−). The comparator 110 outputs a driving signal for the purpose of COT driving, according to a result of a comparison between the reference voltage (VREF) and the feedback voltage.

A COT generator 120 is connected to an output end of the comparator 110, so as to receive the driving signal from the comparator. The COT generator 120 plays a role of outputting an on-time signal to turn on a power switch for a predetermined time interval, in response to the result of comparison at the comparator 110 indicating that the feedback voltage is lower than the reference voltage. The operation of the COT generator 120 is discussed further below.

An output end of the COT generator 120 is connected to power switches, that is, PMOS 142 and NMOS 144, via an inverting buffer 132 and a non-inverting buffer 134, respectively. The PMOS 142 and the NMOS 144 are connected in series with each other. The drains of the PMOS 142 and NMOS 144 are connected to a LX pin 150. The LX pin 150 plays a role of connecting the interior of the chip to the exterior. The drains of the PMOS 142 and NMOS 144 are also electrically connected to a common output node. Their common output is referred to as first node A. The source of the PMOS 142 is connected to a supply voltage (VP) and the source of the NMOS 144 is connected to a ground. Meanwhile, a switching output voltage is outputted to the first node A as a result of the switching operations of the PMOS 142 and NMOS 144.

The inductor 160 is connected to the LX pin 150. A load resistor ($R_L$) is connected in series to one end of the inductor 160. Between the inductor 160 and the load resistor ($R_L$), feedback resistors ($R_1$ and $R_2$) and the capacitor ($C_{OUT}$) are connected in parallel, respectively. The node between the inductor 160 and the load resistor ($R_L$) is referred to as an output voltage node B, and is also referred to as second node B. The node between the feedback resistors ($R_1$ and $R_2$) is referred to as a feedback voltage node C, and is also referred to as third node C. Referring to the drawing, an output pin (VOUT pin) is connected to the second node B, while a feedback pin (FB pin) is connected to the third node C.

The first and second nodes A and B are connected to the coupling network 170.

The coupling network 170 includes one coupling resistor ($R_C$) and two coupling capacitors ($C_C$ and $C_f$). The first node A is connected to the coupling resistor ($R_C$) to receive the switching output voltage at the time of switching of the PMOS 142 and NMOS 144, while the second node B is connected to the first coupling capacitor ($R_C$) to receive an inductor output voltage that passes through the inductor 160. The second coupling capacitor ($C_f$) outputs a first feedback voltage that is transmitted via the coupling resistor ($R_C$) and the first capacitor ($R_C$). The first feedback voltage includes AC voltage.

A second feedback voltage of the output voltage is transmitted via the third node C. The second feedback voltage includes DC voltage.

Meanwhile, the first and second feedback voltages are summed at the output node, that is, fourth node D, and transmitted as a feedback voltage to the inverting terminal (−) of the comparator 110. Accordingly, the inverting terminal (−) of the comparator 110 receives both AC and DC voltages of the output voltage, as discussed above. Thus, in another example, the example provides for a COT mode DC-DC converter in which the comparator 110 receives only the feedback voltage, that is, the second feedback voltage, of the output voltage via the third node C. However, according to an example, the second feedback voltage is added with a noise component of switching output voltage and inductor output voltage being incorporated into the second feedback voltage, before being transmitted to the comparator 110. Since the noise components are forcibly supplied to the first feedback voltage at the output end, it becomes easier to detect the ripple values of the output voltage whenever current flows through the inductor 160.

In other words, the PMOS 142 and the NMOS 144 turn on and turn off depending on the operation of the DC-DC converter. Initially in the operation of the DC-DC converter, the NMOS 144 is in turned-off state. Accordingly, as the PMOS 142 turns on due to the operation of the DC-DC converter, power is supplied via the supply voltage (VP) for that period during which the PMOS 142 is turned on. As a result, the current at the inductor 160 increases at a predetermined slope. Then, later in the operation of the DC-DC converter, as the PMOS 142 turns off and the NMOS 144 turns on, electricity is supplied via the ground based on the NMOS 144 being turned on. As a result, the current at the inductor 160 decreases at a predetermined slope. As a result of such operation and such changes in current, energy is charged in the output capacitor ($C_{OUT}$), and a predetermined voltage is maintained. Accordingly, the current flows through the inductor 160 during turn-on and turn-off operations of the PMOS 142 and the NMOS 144, as described.

Whenever the current flows through the inductor 160, the first feedback voltage, which is a result of adding the switching output voltage and the inductor output voltage, and a second feedback voltage at the output end are summed up together, and the summed voltage is provided to the inverting terminal (−) of the comparator 110.

Figure 2:
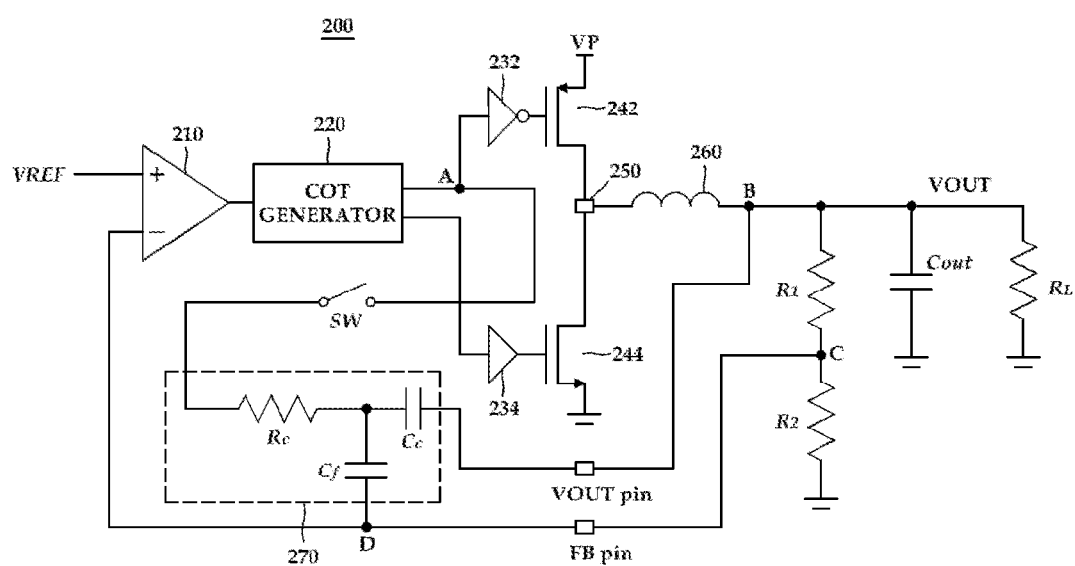
FIG. 2 is a circuit diagram of a DC-DC converter having a coupling network according to a second example.

FIG. 2 is a circuit diagram of a DC-DC converter having a coupling network according to a second example. While certain components are similar between the first and second examples, the overall circuit design of the second example is explained further below, as there are differences between the first example and the second example.

Referring to FIG. 2, the DC-DC converter 200 includes a comparator 210 that receives a reference voltage (VREF) via a non-inverting terminal (+) and receives a feedback voltage via an inverting terminal (−). The comparator 210 outputs a driving signal for the purpose of COT driving, according to a result of a comparison between the reference voltage (VREF) and the feedback voltage.

A COT generator 220 is connected to an output end of the comparator 210, so as to receive the driving signal output by the comparator 210. The COT generator 220 plays a role of outputting an on-time signal to turn on power switch for a predetermined time interval, in response to the result of comparison at the comparator 210 indicating that the feedback voltage is lower than the reference voltage.

Meanwhile, one of the output pins of the COT generator 220 is connected to a coupling network 270, using a first node A. The architecture of the coupling network 270 is discussed further, below. The COT generator 220 is connected at its output end to an inverting buffer 232 and a non-inverting buffer 234 as is explained further below, and the pin connected to the first node A is the pin that is connected to the inverting buffer 232.

Thus, the output end of the COT generator 220 is connected to power switches, that is, PMOS 242 and NMOS 244 via an inverting buffer 232 and a non-inverting buffer 234, respectively. The PMOS 242 and the NMOS 244 are connected in series with each other. The drains of the PMOS 242 and NMOS 244 are both connected to a LX pin 250. The LX pin 250 connects the interior of the chip to the exterior. The source of the PMOS 242 is connected to a supply voltage (VP) and the source of the NMOS 244 is connected to a ground.

The inductor 260 is connected to the LX pin 250. A load resistor ($R_L$) is connected in series to one end of the inductor 260. Between the inductor 260 and the load resistor ($R_L$), feedback resistors ($R_1$ and $R_2$) and the capacitor ($C_{OUT}$) are connected in parallel, respectively. The node between the inductor 260 and the load resistor ($R_L$) is referred to as an output voltage node B, and is also referred to as second node B. The node between the feedback resistors ($R_1$ and $R_2$) is referred to as a feedback voltage node C, and is also referred to as third node C. Referring to FIG. 2, an output pin (VOUT pin) is connected to the second node B, while a feedback pin (FB pin) is connected to the third node C.

The first and second nodes A and B are connected to the coupling network 270.

The coupling network 270 includes one coupling resistor ($R_C$) and two coupling capacitors ($C_C$ and $C_f$). One end of the coupling resistor ($R_C$) is connected to the first node A. A switch (SW) is provided between the first node A and the coupling resistor ($R_C$). The switch (SW) plays a role of operating the DC-DC converter in continuous-current-mode (CCM) or discontinuous-current-mode (DCM), according to whether the switch (SW) is open or closed. In the CCM, continuous current flows via the inductor 260. Furthermore, the duty ratio of the switches including the PMOS 242 and the NMOS 244 is variably controlled according to time to allow the input current to become a sine wave. In the DCM, the current flowing via the inductor 260 is partially blocked. Furthermore, controlling is performed in a manner in which switches including the PMOS 242 and the NMOS 244 are switched at a predetermined duty ratio. Hence, the switches are switched without having to detect input current or voltage. As a result, the peak of the input current follows the input voltage and a median value of the input currents directly becomes a sine wave.

Meanwhile, one end of the first coupling capacitor ($C_C$) is connected to the second node B to receive the inductor output voltage.

The coupling resistor ($R_C$) and the other end of the first coupling capacitor ($C_C$) are connected to the second coupling capacitor ($C_f$). The second coupling capacitor ($C_f$) acts to output the first feedback voltage that is transmitted via the coupling resistor ($R_C$) and the first coupling capacitor ($C_C$). The first feedback voltage includes AC voltage.

A second feedback voltage is transmitted via the third node C. The second feedback voltage includes DC voltage.

Meanwhile, the first and second feedback voltages are summed at the output node, that is, at the fourth node D. The summed voltage is transmitted as a feedback voltage to the inverting terminal (−) of the comparator 210. As a result, the inverting terminal (−) of the comparator 210 receives both AC and DC voltages.

By including not only DC voltage, but also AC voltage of the output voltage in the feedback voltage applied to the comparator 210, it becomes easier to detect the ripple values of the output voltage whenever the electric current flows through the inductor 260 according to whether the PMOS 242 and the NMOS 244 are turned on.

Meanwhile, the DC-DC converter according to the second example may operate in CCM and DCM and switch between these operational modes.

Whether to use CCM or DCM is determined based on the electric currents at the inductor 260. For example, the slope of the inductor current declines when the NMOS 244 turns on. Hence, an example turns off the NMOS 244 at a time point that the slope becomes zero. That is, during CCM operation, an example turns on the PMOS 242 and turns off the NMOS 244 when the inductor current has a negative value, because this leads to declining output voltage. Accordingly, the time point that the NMOS 244 is forced to become OFF is when the DCM operation begins.

The operation to forcibly turn off the NMOS 244 and switch from CCM to DCM operation is potentially performed according to ON/OFF operation of the switch (SW). For example, the operation of the switch (SW) is performed by an integrated circuit (IC) or a central processing unit (CPU) that controls the operation of the DC-DC converter.

The switch (SW) is open in DCM operation. This means that the coupling network 270 is not in use. That is, in DCM operation, the ripple value of the output voltage is large enough to allow the detection of the feedback voltage, without having to use the coupling network 270.

Another DC-DC converter configured according to a third example is explained below with reference to FIG. 3 which shows a circuit diagram of a DC-DC converter having a coupling network according to the third example.

Figure 3:
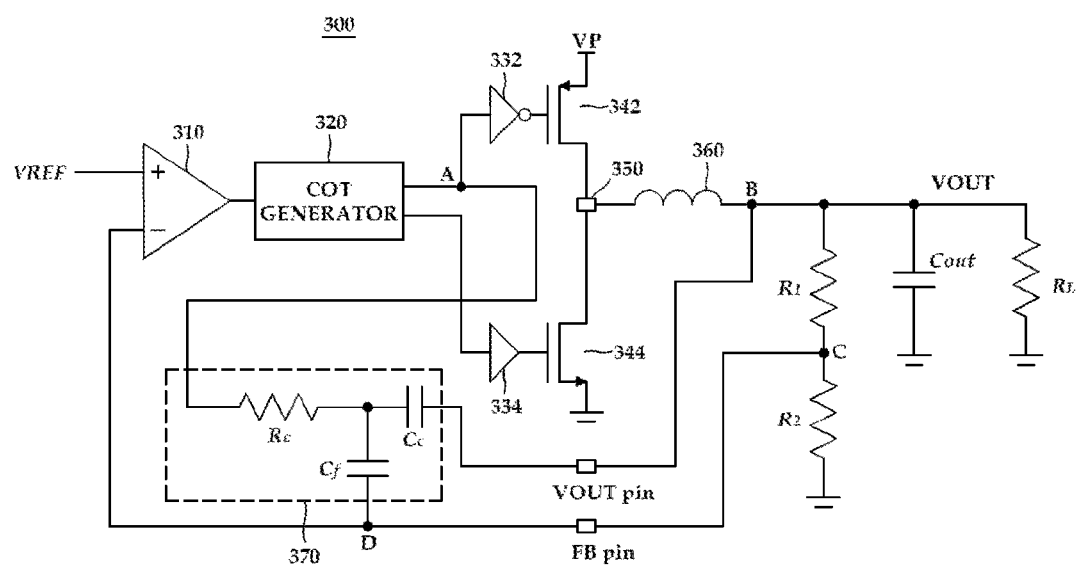
FIG. 3 is a circuit diagram of a DC-DC converter having a coupling network according to a third example.

Referring to FIG. 3, the DC-DC converter 300 according to the third example has an identical architecture as that of the DC-DC converter 200 according to the second example, except for the difference that the DC-DC converter 300 according to the third example does not have the switch (SW) between the first node A and the coupling resistor ($R_C$). Thus, in the DC-DC converter according to the third example, the first node A and the coupling resistor ($R_C$) are shorted.

The DC-DC converter 300 operates in one of the CCM and DCM when the first node A and the coupling resistor ($R_C$) are connected to each other.

The DC-DC converters according to the first to third examples have been explained above.

These DC-DC converters 100, 200, 300 include features to take into account electrostatic discharge (ESD) or electric overstress (EOS) experienced as part of their operation.

Referring to the DC-DC converter 100 illustrated in FIG. 1, the DC-DC converter 100 includes the PMOS 142 and the NMOS 144 that provide the ESD effect. In other words, the PMOS 142 and the NMOS 144 play a role of regulating ESD themselves.

Further, the DC-DC converter 100 according to the first example has the coupling resistor ($R_C$) for performing ESD operation is connected to the LX pin 150. Accordingly, the DC-DC converter 100 has a coupling resistor ($R_C$) with a large resistance to ensure that the chip is protected from the ESD stress. That is, the heat inside the chip has to be dissipated sufficiently. If the coupling resistor ($R_C$) has a lower resistance, the coupling resistor ($R_C$) and the coupling capacitors ($C_C$ and $C_f$) inside the chip are damaged. Accordingly, the resistance of the coupling resistor ($R_C$) according to the first example is determined in consideration of managing the ESD.

Alternatively, in the DC-DC converters 200, 300 illustrated in FIGS. 2 and 3, the coupling resistor ($R_C$) of the coupling network 270 is connected to interior of the chip. Thus, the coupling resistor ($R_C$) is connected to the output pin of the COT generator 220, 320. In this manner, the coupling resistor ($R_C$) operates as an internal load for the chip so that it is free from influence of the EOS and does not have to consider the ESD. Hence, it such a DC-DC converter may be designed without having to consider the coupling resistor ($R_C$) because it is able to ignore the EOS and the ESD as discussed.

In another example, the power switches, which are illustrated in FIGS. 1-3 as being PMOS and NMOS switches, provided at the output end of the COT generators 120. 220. 320 of the DC-DC converters 100, 200, 300 are interchangeable. That is, it is possible to employ NMOS instead of PMOS or vice versa, as long as the architecture of the DC-DC converters 100, 200, 300 are adapted appropriately for such an architecture.

As explained above, according to examples, a separate noise source is added into the feedback output voltage of the DC-DC converter, to allow easier detection of the ripple value of the feedback output voltage whenever the inductor operates. As a result, the DC-DC converter provides stable, efficient operation, even when operating in COT mode.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such as parallel processors.

As a non-exhaustive illustration only, a terminal/device/unit described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blu-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A DC-DC converter, comprising:
a comparator configured to compare a reference voltage to a feedback voltage;
a constant on-time (COT) generator configured to output an on-time signal of a power switch, in response to a result of the comparison at the comparator;
a first switch and a second switch each configured to turn on for a predetermined time interval, according to the on-time signal;
an inductor connected in series to a common terminal of the first and second switches;

a first feedback resistor and a second feedback resistor connected between the inductor and a load resistor; and a coupling network comprising a coupling resistor, the coupling network configured to receive the on-time signal through the coupling resistor and a feedback output voltage of the inductor, sum the received voltages, and output the result of summing as a first feedback voltage, wherein the first feedback voltage and a second feedback voltage outputted via the first feedback resistor and the second feedback resistor are directly provided as the feedback voltage of the comparator.

2. The DC-DC converter of claim 1, wherein the coupling network further comprises:
the coupling resistor connected to the common terminal;
a first coupling capacitor connected to an output end of the inductor; and
a second coupling capacitor that is connected in parallel to the coupling resistor and the first coupling capacitor and that is configured to output the first feedback voltage.

3. The DC-DC converter of claim 1, wherein the first feedback voltage comprises an AC voltage of the output voltage of switching voltages of the first switch, switching voltages of the second switch and the inductor.

4. The DC-DC converter of claim 1, wherein the second feedback voltage comprises a DC voltage of an output voltage of an output end of the converter.

5. The DC-DC converter of claim 1, wherein the first and second switches are complementary MOS transistors.

6. The DC-DC converter of claim 5, wherein, in response to the first switch being PMOS, the second switch is NMOS, or in response to the first switch being NMOS, the second switch is PMOS.

7. The DC-DC converter of claim 1, wherein the first feedback voltage and the second feedback voltage are supplied to the comparator, in response to electric current flowing through the inductor.

8. The DC-DC converter of claim 1, wherein the DC-DC converter is configured to operate in continuous-current-mode (CCM) or discontinuous-current-mode (DCM).

9. A DC-DC converter, comprising:
a comparator configured to compare a reference voltage to a feedback voltage;
a constant on-time (COT) generator configured to output an on-time signal of a power switch, in response to a result of the comparison at the comparator;
a first switch and a second switch each configured to turn on for a predetermined time interval, according to the on-time signal;
an inductor connected in series to a common terminal of the first and second switches;
a first feedback resistor and a second feedback resistor connected between the inductor and a load resistor; and
a coupling resistor connected to an output pin of the COT generator, a first coupling capacitor connected to an output end of the inductor, and a second coupling capacitor connected in parallel to the coupling resistor and the first coupling capacitor to output the first feedback voltage,
wherein the first feedback voltage and a second feedback voltage outputted via the first feedback resistor and the second feedback resistor are directly provided as the feedback voltage of the comparator.

10. The DC-DC converter of claim 9, further comprising a third switch between the output pin of the COT generator and the coupling resistor to select between a continuous current mode (CCM) and a discontinuous current mode (DCM) according to an electric current flowing through the inductor.

11. The DC-DC converter of claim 9, wherein the first feedback voltage comprises a DC voltage of the output voltage, and the second feedback voltage comprises an AC voltage of the output voltage.

12. The DC-DC converter of claim 10, wherein the first and second switches are complementary MOS transistors, and in response to the first switch being PMOS, the second switch is NMOS, or in response to the first switch being NMOS, the second switch is PMOS.

13. The DC-DC converter of claim 12, wherein the converter is configured to operate in CCM until a current slope of the inductor becomes zero.

14. The DC-DC converter of claim 12, wherein the converter is configured to operate in DCM when current slope of the inductor has a negative value.

15. The DC-DC converter of claim 14, wherein the second switch is turned off and the first switch is turned on at a time point when the current slope of the inductor becomes a negative value.

16. The DC-DC converter of claim 15, wherein the second switch is NMOS and the first switch is PMOS.

17. A coupling network configured to receive switching voltages of a first switch and a second switch and a feedback output voltage of an inductor, sum the received voltages, and output the result of summing as a first feedback voltage, wherein the coupling network comprises:
a coupling resistor connected to a common terminal of the first and second switches, wherein the inductor is connected in series to the common terminal;
a first coupling capacitor connected to an output end of the inductor; and
a second coupling capacitor that is connected in parallel to the coupling resistor and the first coupling capacitor and that is configured to output the first feedback voltage,
wherein the first switch and the second switch are configured to turn on for a predetermined time interval, according to an on-time signal of a power switch generated by a constant on-time (COT) generator, and
wherein the coupling resistor is further connected to an output of the COT generator.

18. The coupling network of claim 17, wherein the first feedback voltage comprises an AC voltage of the output voltage of the switching voltages and the inductor.

19. The coupling network of claim 17, wherein the COT generator generates the on-time signal of the power switch in response to a result of a comparison at a comparator that is configured to compare a reference voltage to a feedback voltage.

20. The coupling network of claim 19, wherein the first feedback voltage and a second feedback voltage outputted via the feedback resistor are directly provided as the feedback voltage of the comparator.

21. A DC-DC converter configured to operate in continuous-current-mode (CCM) or discontinuous-current-mode (DCM), the DC-DC converter comprising the coupling network of claim 17.

* * * * *